United States Patent
Raeis Hosseiny et al.

(10) Patent No.: US 11,733,690 B2
(45) Date of Patent: Aug. 22, 2023

(54) REMOTE CONTROL SYSTEM FOR A VEHICLE AND TRAILER

(71) Applicant: Ford Global Technologies, LLC, Dearborn, MI (US)

(72) Inventors: Seyed Armin Raeis Hosseiny, Canton, MI (US); Bo Bao, Bloomfield, MI (US); Siyuan Ma, Detroit, MI (US); Erick Michael Lavoie, Van Buren Charter Township, MI (US); Hamid M. Golgiri, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 144 days.

(21) Appl. No.: 16/921,645

(22) Filed: Jul. 6, 2020

(65) Prior Publication Data
US 2022/0004183 A1    Jan. 6, 2022

(51) Int. Cl.
G05D 1/00    (2006.01)
G05D 1/02    (2020.01)

(52) U.S. Cl.
CPC ......... G05D 1/0016 (2013.01); G05D 1/0044 (2013.01); G05D 1/0212 (2013.01)

(58) Field of Classification Search
CPC ... G05D 1/0016; G05D 1/0044; G05D 1/0212
See application file for complete search history.

(56) References Cited

U.S. PATENT DOCUMENTS

| | | | |
|---|---|---|---|
| 2007/0244635 A1* | 10/2007 | Asahara | G01C 21/3415 701/416 |
| 2013/0099919 A1* | 4/2013 | Cai | G08B 7/066 340/539.13 |
| 2017/0008563 A1* | 1/2017 | Popken | B62D 13/06 |
| 2017/0131713 A1 | 5/2017 | Burkhart et al. | |
| 2018/0357907 A1* | 12/2018 | Reiley | H04W 4/023 |
| 2019/0113351 A1* | 4/2019 | Antony | G01C 21/3664 |
| 2020/0247471 A1* | 8/2020 | Grodde | G06V 20/58 |

FOREIGN PATENT DOCUMENTS

| | | | | |
|---|---|---|---|---|
| DE | 102016118967 A1 * | 4/2018 | | G01S 7/003 |
| DE | 102016224528 A1 | 6/2018 | | |
| DE | 102019106520 A1 | 9/2019 | | |
| WO | WO-2015199600 A1 * | 12/2015 | | G08C 17/02 |

OTHER PUBLICATIONS

English Translation of DE-102016118967-A1.*

* cited by examiner

*Primary Examiner* — Jess Whittington
(74) *Attorney, Agent, or Firm* — Frank Lollo; Eversheds Sutherland (US) LLP (57) ABSTRACT

The disclosure describes systems and methods including a mobile device for remotely controlling the movement of a vehicle and trailer. The mobile device provides an intuitive interface for controlling the movement of the vehicle and trailer by changing the orientation of a vehicle graphic (e.g., of the vehicle and trailer) according to a position of the mobile device around a periphery of the vehicle and trailer. This allows the user to walk around the vehicle and trailer to determine a best position from which to control the vehicle and trailer depending on a given situation without losing the intuitiveness of the user interface.

17 Claims, 10 Drawing Sheets

REMOTE CONTROL SYSTEM FOR A VEHICLE AND TRAILER

BACKGROUND

Operating a vehicle with a trailer in tow is very challenging for many drivers. This is particularly true for drivers that are unskilled at backing up vehicles with attached trailers. Such drivers may include those that drive with a trailer on an infrequent basis (e.g., drivers that rent a trailer). In particular, when manually reversing a trailer, the direction of the steering wheel input may be counterintuitive to the resulting trailer direction.

Moreover, in remote control situations, a steering wheel angle that should be used to achieve a certain path shape may be difficult to keep track of as a perspective changes at different positions around the vehicle and trailer. A control input that is used to move the trailer one way (e.g., back and to the left) may be intuitive to the user when the user is standing behind the vehicle but counter intuitive when the user is standing in front of the vehicle.

It is with respect to these and other considerations that the disclosure made herein is presented.

DESCRIPTION OF THE FIGURES

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

The systems and methods disclosed herein are configured to provide a mobile device for remotely controlling the movement of a vehicle and trailer. The mobile device provides an intuitive interface for controlling the movement of the vehicle and trailer by changing the orientation of a vehicle graphic (e.g., of the vehicle and trailer) according to a position of the mobile device around a periphery of the vehicle and trailer. This allows the user to walk around the vehicle and trailer to determine a best position from which to control the vehicle and trailer depending on a given situation without losing the intuitiveness of the user interface. For example, the user can change position to check for clearance of obstacles in a path before or during control of the vehicle and trailer.

By orienting the vehicle graphic on the user interface of the mobile device to correspond to a user's perspective view of the vehicle and trailer (from a location around the periphery of the vehicle and trailer), controls that are then arranged with respect to the vehicle graphic are intuitive.

In particular, a forward path graphic is positioned at a front end of the vehicle graphic and displays a path extending in a forward direction from the vehicle graphic. A reverse path graphic is positioned at a rear end of the vehicle graphic and displays a path extending in a reverse direction from the vehicle graphic. The path graphics and the forward and reverse directions are aligned with a longitudinal axis of the vehicle graphic.

Forward and reverse control inputs are positioned along an axis that is generally parallel (e.g., +/−45 degrees) to the longitudinal axis of the vehicle graphic and correspond to the forward and reverse directions.

Arranging the orientation of the vehicle graphic, path graphic, and controls in this way makes it clear how the vehicle and trailer moves along each path and which control input to use to move the vehicle and trailer along each path. The user does not have to remember which path or control input corresponds to forward and which to reverse. Rather, for example, a path that is shown on the user interface as moving the vehicle and trailer to the left from the perspective of the user has a corresponding control input pointing in the left direction for initiating the movement along that path.

The shape of the path represents the steering wheel angle of the vehicle as a function of distance or location along a path. The use of a path and a directional control removes the need to know the correct steering wheel input to achieve a path. The shape of the path can be changed by the user, for example, by rotation of the mobile device. Accordingly, the user interface simplifies the control of the vehicle and trailer to intuitive selection of a shape of a path in a forward or reverse direction (e.g., because of the orientation of the vehicle graphic) and using the corresponding control input to initiate movement along that path.

These and other advantages of the present disclosure are provided in greater detail herein.

Illustrative Embodiments

The disclosure will be described more fully hereinafter with reference to the accompanying drawings, in which exemplary embodiments of the disclosure are shown, and not intended to be limiting.

Figure 1:
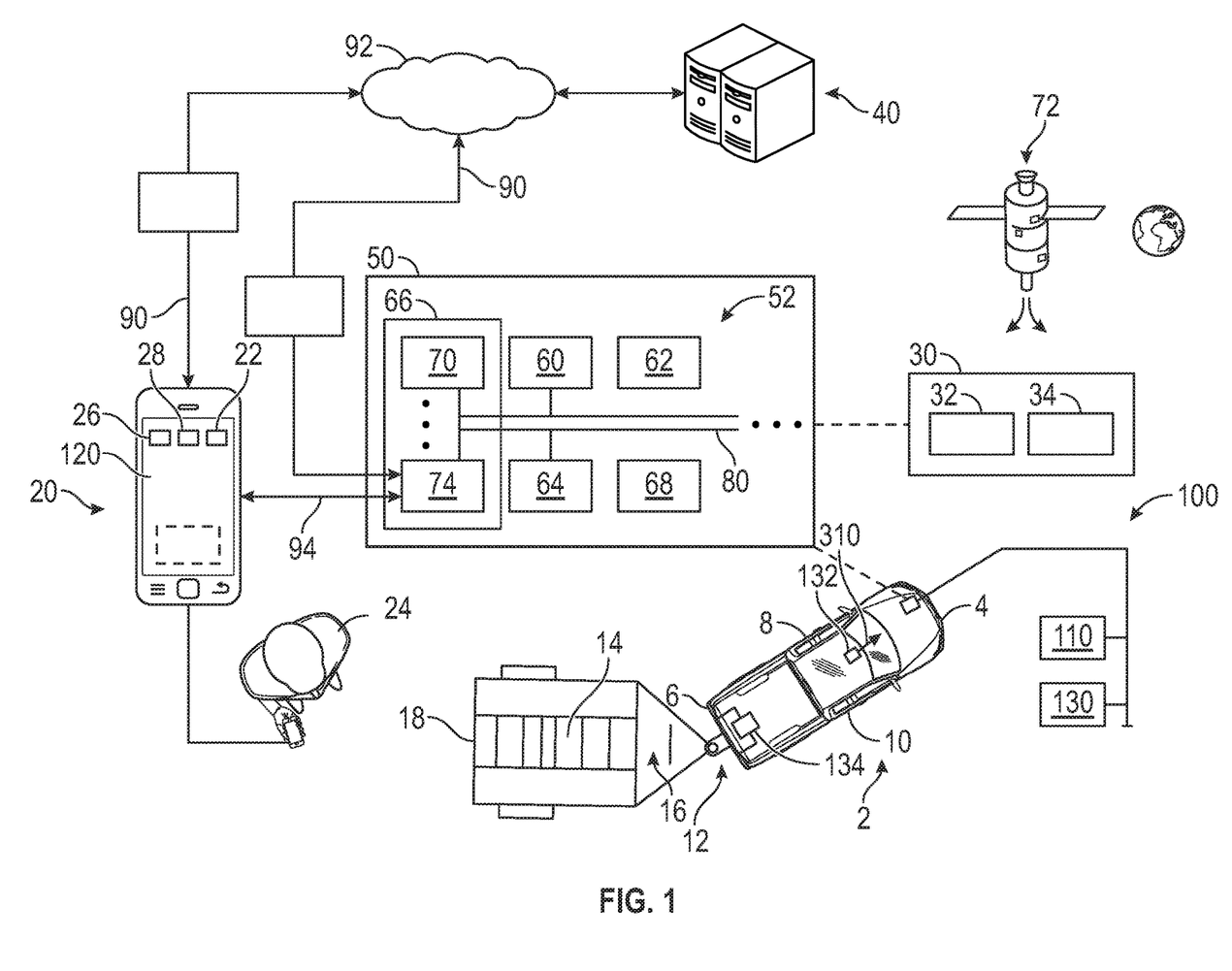
FIG. 1 depicts a vehicle, a trailer, and an example functional schematic of a vehicle control system for controlling the vehicle with a mobile device in accordance with the present disclosure.

FIG. 1 illustrates a vehicle 2. The vehicle 2 includes a front end 4, a back end 6, a left side 8 (e.g., a driver side), and a right side 10 (e.g., a passenger side). The vehicle 2 includes a hitch 12. The hitch 12 (also referred to as a tow hitch, a tow bar, a trailer hitch, etc.) is located at the back end 6 of the vehicle 2. For example, the hitch 12 is coupled to and extends from a chassis of the vehicle 2.

Although illustrated as a truck, the vehicle 2 may take the form of another passenger or commercial automobile such as, for example, a car, a sport utility, a crossover vehicle, a van, a minivan, a taxi, a bus, etc., and may be configured to include various types of automotive drive systems. Example drive systems can include various types of internal combustion engine (ICE) powertrains having a gasoline, diesel, or natural gas-powered combustion engine with conventional drive components such as, a transmission, a drive shaft, a differential, etc.

In another configuration, the vehicle 2 may be configured as an electric vehicle (EV). More particularly, the vehicle 2 may include a battery EV (BEV) drive system. The vehicle 2 may be configured as a hybrid EV (HEV) having an independent onboard power plant or a plug-in HEV (PHEV) that includes a HEV powertrain connectable to an external power source (including a parallel or series hybrid powertrain having a combustion engine power plant and one or more EV drive systems). HEVs can include battery and/or super capacitor banks for power storage, flywheel power storage systems, or other power generation and storage infrastructure.

The vehicle 2 may be further configured as a fuel cell vehicle (FCV) that converts liquid or solid fuel to usable power using a fuel cell, (e.g., a hydrogen fuel cell vehicle (HFCV) powertrain, etc.) and/or any combination of these drive systems and components.

Further, the vehicle 2 may be a manually driven vehicle, and/or be configured to operate in a fully autonomous (e.g., driverless) mode (e.g., level-5 autonomy) or in one or more partial autonomy modes. Examples of partial autonomy modes are widely understood in the art as autonomy Levels 1 through 5.

An autonomous vehicle (AV) having Level 1 autonomy may generally include a single automated driver assistance feature, such as steering or acceleration assistance. Adaptive cruise control is one such example of a Level-1 autonomous system that includes aspects of both acceleration and steering.

Level-2 autonomy in vehicles may provide partial automation of steering and acceleration functionality, where the automated system(s) are supervised by a human driver that performs non-automated operations such as braking and other controls.

Level-3 autonomy in a vehicle can generally provide conditional automation and control of driving features. For example, Level-3 vehicle autonomy typically includes "environmental detection" capabilities, where the vehicle can make informed decisions independently from a present driver, such as accelerating past a slow-moving vehicle, while the present driver remains ready to retake control of the vehicle if the system is unable to execute the task.

Level 4 autonomy includes vehicles having high levels of autonomy that can operate independently from a human driver, but still include human controls for override operation. Level-4 automation may also enable a self-driving mode to intervene responsive to a predefined conditional trigger, such as a road hazard or a system failure.

Level 5 autonomy is associated with autonomous vehicle systems that require no human input for operation, and generally do not include human operational driving controls.

A trailer 14 includes a front end 16 and a back end 18. Trailers are utilized for various purposes including hauling objects (e.g., other vehicle), moving, and camping.

The trailer 14 is coupled to the vehicle 2 via the hitch 12 such that the vehicle 2 is able to pull or push the trailer 14 from one location to another location. The hitch 12 is configured to receive a trailer connector (as illustrated, located at the front end 16) of the trailer 14 to couple the trailer 14 to the vehicle 2.

The hitch 12 allows the trailer 14 to rotate. The trailer 14 follows the path of the vehicle 2 when the vehicle 2 moves forward. The path of the trailer 14 when the vehicle 2 moves in reverse depends on the direction of force (e.g., due to steering angle) applied by the vehicle 2 at the hitch 12. If the longitudinal axes of the vehicle 2 and trailer 14 are aligned through the hitch 12, the path is straight. If the longitudinal axis of the vehicle 2 and the longitudinal axis of the trailer 14 are at an angle, the path is has a curved shape.

The movement of the vehicle 2 and trailer 14 may be remotely controlled by a user 24 using a mobile device 20 according to systems and methods described in further detail below. The mobile device 20 generally includes a memory 26 and a processor 28. The memory stores an application 22 including program instructions that, when executed by the mobile device processor 28, performs aspects of the disclosed embodiments.

The application 22 may be part a of a vehicle control system 100 described below or may provide and or receive information from the vehicle control system 100.

The mobile device 20 further includes a user interface 120 and sensors including a compass sensor 410 (see FIG. 4), an accelerometer 510 (see FIG. 5), and a camera.

The vehicle 2 includes an automotive computer 30. The automotive computer 30 may be or include an electronic vehicle controller. The automotive computer 30 may be installed in an engine compartment of the vehicle 2 as schematically illustrated or elsewhere in the vehicle 2. The automotive computer 30 may operate as part of a vehicle control system described in further detail below.

The automotive computer 30 may include one or more processor(s) 32 and a computer-readable memory 34. The one or more processor(s) 32 may be disposed in communication with one or more memory devices disposed in communication with the respective computing systems (e.g., the memory 34 and/or one or more external databases). The processor(s) 32 may utilize the memory 34 to store programs in code and/or to store data for performing aspects of methods in accordance with the disclosure.

The memory 34 may be a non-transitory computer-readable memory storing program code. The memory 34 can include any one or a combination of volatile memory elements (e.g., dynamic random access memory (DRAM), synchronous dynamic random access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc.

The automotive computer 30 may, in some example embodiments, be disposed in communication with the mobile device 20 and one or more server(s) 40. The server(s) 40 may be part of a cloud-based computing infrastructure, and may be associated with and/or include a Telematics Service Delivery Network (SDN) that provides digital data services to the vehicle 2 and other vehicles that may be part of a vehicle fleet.

The vehicle 2 includes a Vehicle Controls Unit (VCU) 50. The VCU 50 includes a plurality of electronic control units (ECUs) 52 disposed in communication with the automotive computer 30.

The VCU 50 may coordinate the data between vehicle systems, connected servers (e.g., the server(s) 40), and other vehicles operating as part of a vehicle fleet. The VCU 50 can include or communicate with any combination of the ECUs 52, such as, for example, a Body Control Module (BCM) 60, an Engine Control Module (ECM) 62, a Transmission Control Module (TCM) 64, a Telematics Control Unit (TCU) 66, a Restraint Control Module (RCM) 68, and the like.

The VCU 50 may control aspects of the vehicle 2, and implement one or more instruction sets received from the application 22 operating on the mobile device 20, and/or from instructions received from a vehicle system controller (such as vehicle system controller 110 described in further detail below).

The TCU 66 can be configured to provide vehicle connectivity to wireless computing systems onboard and off-board the vehicle 2 and is configurable for wireless communication between the vehicle 2 and other systems, computers, and modules. For example, the TCU 66 includes a Navigation (NAV) system 70 for receiving and processing a GPS signal from a GPS 72, a Bluetooth® Low-Energy Module (BLEM) 74, a Wi-Fi transceiver, an Ultra-Wide Band (UWB) transceiver, and/or other wireless transceivers.

The NAV system 70 may be configured and/or programmed to determine a position of the vehicle 2 and the trailer 14. The NAV system 70 may include a Global Positioning System (GPS) receiver configured or programmed to triangulate the position of the vehicle 2 relative to satellites or terrestrial based transmitter towers associated with the GPS 72. The NAV system 70, therefore, may be configured or programmed for wireless communication.

The NAV system 70 may be further configured or programmed to develop routes from a current location to a selected destination, as well as display a map and present driving directions to the selected destination via, e.g., the user interface 120. In some instances, the NAV system 70 may develop the route according to a user preference. Examples of user preferences may include maximizing fuel efficiency, reducing travel time, travelling the shortest distance, or the like.

The TCU 66 generally includes wireless transmission and communication hardware that may be disposed in communication with one or more transceivers associated with telecommunications towers and other wireless telecommunications infrastructure. For example, the BLEM 74 may be configured and/or programmed to receive messages from, and transmit messages to, one or more cellular towers associated with a telecommunication provider, and/or and a Telematics Service Delivery Network (SDN) associated with the vehicle 2 for coordinating vehicle fleet.

The TCU 66 may be disposed in communication with the ECUs 52 by way of a Controller Area Network (CAN) bus 80. In some aspects, the TCU 66 may retrieve data and send data as a CAN bus 80 node.

The BLEM 74 may establish wireless communication using Bluetooth® and Bluetooth Low-Energy® communication protocols by broadcasting and/or listening for broadcasts of small advertising packets, and establishing connections with responsive devices that are configured according to embodiments described herein. For example, the BLEM 74 may include Generic Attribute Profile (GATT) device connectivity for client devices that respond to or initiate GATT commands and requests, and connect directly with the mobile device 20.

The CAN bus 80 may be configured as a multi-master serial bus standard for connecting two or more of the ECUs 52 as nodes using a message-based protocol that can be configured and/or programmed to allow the ECUs 52 to communicate with each other. The CAN bus 80 may be or include a high speed CAN (which may have bit speeds up to 1 Mb/s on CAN, 5 Mb/s on CAN Flexible Data Rate (CAN FD)), and can include a low-speed or fault tolerant CAN (up to 125 Kbps), which may, in some configurations, use a linear bus configuration. In some aspects, the ECUs 52 may communicate with a host computer (e.g., the automotive computer 30, the system 100, and/or the server(s) 40, etc.), and may also communicate with one another without the necessity of a host computer.

The CAN bus 80 may connect the ECUs 52 with the automotive computer 30 such that the automotive computer 30 may retrieve information from, send information to, and otherwise interact with the ECUs 52 to perform steps described according to embodiments of the present disclosure. The CAN bus 80 may connect CAN bus nodes (e.g., the ECUs 52) to each other through a two-wire bus, which may be a twisted pair having a nominal characteristic impedance. The CAN bus 80 may also be accomplished using other communication protocol solutions, such as Media Oriented Systems Transport (MOST) or Ethernet. In other aspects, the CAN bus 80 may be a wireless intra-vehicle CAN bus.

The VCU 50 may control various loads directly via the CAN bus 80 communication or implement such control in conjunction with the BCM 60. The ECUs 52 described with respect to the VCU 50 are provided for exemplary purposes only, and are not intended to be limiting or exclusive. Control and/or communication with other control modules is possible, and such control is contemplated.

The ECUs 52 may control aspects of vehicle operation and communication using inputs from human drivers, inputs from a vehicle system controller 110, the vehicle control system 100, and/or via wireless signal inputs received via wireless channel(s) 94 from other connected devices such as the mobile device 20, among others. The ECUs 52, when configured as nodes in the CAN bus 80, may each include a central processing unit (CPU), a CAN controller, and/or a transceiver. For example, although the mobile device 20 is depicted in FIG. 1 as connecting to the vehicle 2 via the BLEM 74, it is contemplated that the wireless connection may also or alternatively be established between the mobile device 20 and one or more of the ECUs 52 via the respective transceiver(s) associated with the module(s).

The BCM 60 generally includes an integration of sensors, vehicle performance indicators, and variable reactors associated with vehicle systems, and may include processor-based power distribution circuitry that can control functions associated with the vehicle body such as lights, windows, security, door locks and access control, and various comfort controls. The BCM 60 may also operate as a gateway for bus and network interfaces to interact with remote ECUs.

The BCM 60 may coordinate any one or more functions from a wide range of vehicle functionality, including energy management systems, alarms, vehicle immobilizers, driver and rider access authorization systems, Phone-as-a-Key (PaaK) systems, driver assistance systems, Autonomous Vehicle (AV) control systems, power windows, doors, actuators, and other functionality, etc. The BCM 60 may be configured for vehicle energy management, exterior lighting control, wiper functionality, power window and door functionality, heating ventilation and air conditioning systems, and driver integration systems. In other aspects, the BCM 60 may control auxiliary equipment functionality, and/or is responsible for integration of such functionality. In one aspect, a vehicle having a vehicle control system 100 may integrate the system using, at least in part, the BCM 60.

The mobile device 20 may connect with the automotive computer 30 using wired and/or wireless communication protocols and transceivers. The mobile device 20 may be communicatively coupled with the vehicle 2 via one or more network(s) 92, which may communicate via one or more wireless channel(s) 94, and/or may connect with the vehicle 2 directly using near field communication (NFC) protocols, Bluetooth® protocols, Wi-Fi, Ultra-Wide Band (UWB), and other possible data connection and sharing techniques. The vehicle 2 may also receive and/or be in communication with the Global Positioning System (GPS) 72.

In some aspects, the mobile device 20 may communicate with the vehicle 2 through the one or more wireless channel(s) 90, which may be encrypted and established between the mobile device 20 and the Telematics Control Unit (TCU) 66. The mobile device 20 may communicate with the TCU 66 using a wireless transmitter associated with the TCU 66 on the vehicle 2. The transmitter may communicate with the mobile device 20 using a wireless communication network such as, for example, the one or more network(s) 92. The wireless channel(s) 90 are depicted in FIG. 1 as communicating via the one or more network(s) 92, and also via direct communication (e.g., channel 94) with the vehicle 2.

The network(s) 92 illustrate an example of an example communication infrastructure in which the connected devices discussed in various embodiments of this disclosure may communicate. The network(s) 92 may be and/or include the Internet, a private network, public network or other configuration that operates using any one or more known communication protocols such as, for example, transmission control protocol/Internet protocol (TCP/IP), Bluetooth®, Wi-Fi based on the Institute of Electrical and Electronics Engineers (IEEE) standard 802.11, Ultra-Wide Band (UWB), and cellular technologies such as Time Division Multiple Access (TDMA), Code Division Multiple Access (CDMA), High Speed Packet Access (HSPDA), Long-Term Evolution (LTE), Global System for Mobile Communications (GSM), and Fifth Generation (5G), to name a few examples.

FIG. 1 illustrates an example functional schematic of the vehicle control system 100 of the vehicle 2 including some elements described above. The vehicle control system 100 can include a vehicle system controller 110, the mobile device 20 with the application 22 and a user interface 120 (e.g., a touch-sensitive display screen), and a plurality of sensors 130.

The vehicle system controller 110 may be configured or programmed to control one or more vehicle subsystems. Examples of subsystems that may be controlled by the vehicle system controller 110 may include one or more systems for controlling braking, ignition, steering, acceleration, transmission control, and/or other control mechanisms. The vehicle system controller 110 may control the subsystems based, at least in part, on signals generated by the sensors 130 and the mobile device 20 (e.g., signal 1220).

The mobile device 20 may be configured or programmed to present information to the user 24 via the user interface 120 during operation of the vehicle 2. Moreover, the mobile device 20 may be configured or programmed to receive inputs from the user 24 via the user interface 120 to operate the vehicle 2. The mobile device 20 can be used to control the vehicle 2 at various locations or positions outside and around the vehicle 2.

The mobile device 20 may also provide data transfer functions of the system 100. For example, the mobile device 20 (e.g., a smartphone) connects to the vehicle 2 to obtain sensor data from sensors 130 on behalf of the vehicle control system 100.

The sensors 130 may include autonomous driving sensors, which include any number of devices configured or programmed to generate signals that help navigate the vehicle 2 while the vehicle 2 is operating in the autonomous (e.g., driverless) mode. Examples of autonomous driving sensors include a Radio Detection and Ranging (RADAR or "radar") sensor configured for detection and localization of objects using radio waves, a Light Detecting and Ranging (LiDAR or "lidar") sensor, a vision sensor system having trajectory, obstacle detection, object classification, augmented reality, and/or other capabilities, and/or the like.

The sensors 130 further include a direction sensor 132 (e.g., a compass) of the vehicle 2 and an angle sensor 134 that is configured to determine an angle between the vehicle 2 and the trailer 14.

Figure 2:
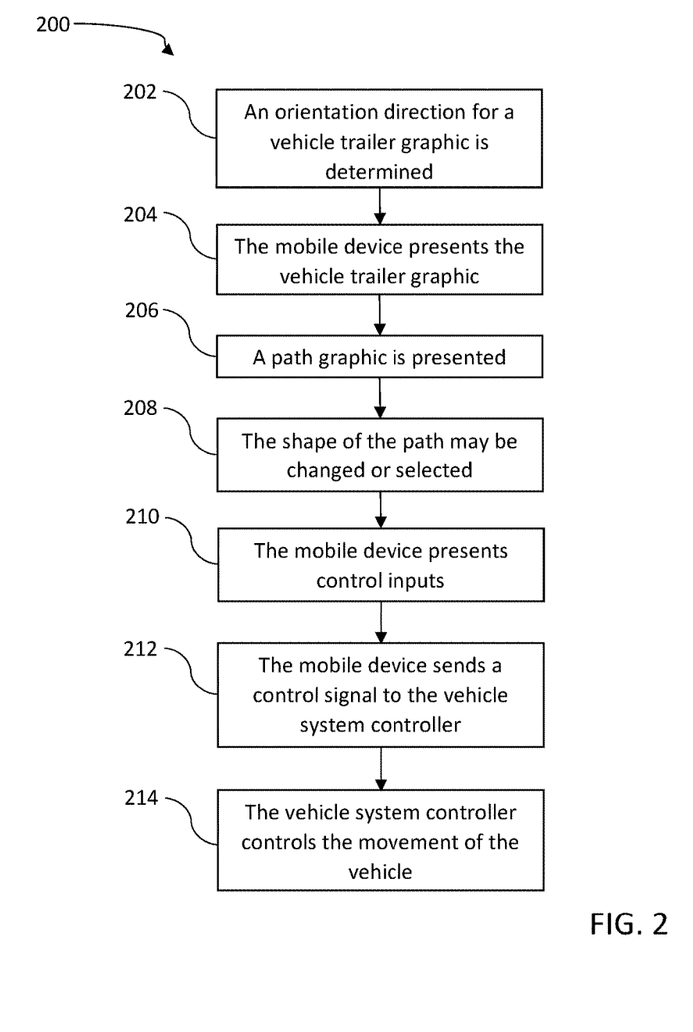
FIG. 2 is a flow chart of an example method of controlling the vehicle with a mobile device in accordance with the present disclosure.

Referring to FIG. 2, the vehicle system controller 110 may receive control signals 1220 from the mobile device 20, and maneuver the vehicle 2 to move the trailer 14 based on a determined maneuver path 1200, 1202 and direction from a control input 1210, 1212.

An example method 200 of controlling the vehicle 2 and trailer 14 is described. For example, the steps 202-212 of the method 200 may be performed by the processor 28 upon executing instructions of the application 22 that are stored in memory 26.

According to a step 202, an orientation direction 400 for a vehicle trailer graphic 300, 302 is determined (e.g., according to methods described in further detail below). The vehicle trailer graphic 300, 302 represents the vehicle 2 and the trailer 14. The orientation direction 400 for the vehicle trailer graphic 300, 302 is determined from one of a plurality of orientation directions 400 for the vehicle trailer graphic 300, 302. Each of the plurality of orientation directions 400 corresponds to a location 430 of the mobile device 20 around a periphery 420 of the vehicle 2 and the trailer 14 (e.g., see FIG. 4).

According to a step 204, the mobile device 20 presents the vehicle trailer graphic 300, 302 in the orientation direction 400 via the user interface 120.

According to a step 206, a path graphic 1200, 1202 including a shape of a path is presented via the user interface 120. The path graphic 1200, 1202 represents a controlled movement of the vehicle 2 and trailer 14 in one of a forward direction (e.g., forward path graphic 1200 aligned with a front end of vehicle graphic 300, 302) and a reverse direction (e.g., reverse path graphic 1202 aligned with a back end of vehicle graphic 300, 302) from a first location to a second location.

The mobile device 20 presents the path graphic 1200, 1202 to extend from the vehicle trailer graphic 300, 302. For example, the path graphics 1200, 1202 are aligned with a longitudinal axis 316 of the vehicle graphic 300, 302 (e.g., the directions 310, 312).

According to a step 208, the shape of the path 1200, 1202 may be changed or selected from one of a plurality of shapes of paths.

According to a step 210, the mobile device 20 presents control inputs 1210, 1212 corresponding to a direction of movement along the path. The control inputs 1210, 1212 are aligned on a parallel axis 318 that is generally parallel (e.g., +/−45 degrees) to the longitudinal axis 316 of the vehicle graphic 300, 302. For example, forward control input 1210 represents forward movement along a forward path represented by forward path graphic 1200 and reverse control input 1212 represents reverse movement along a reverse path represented by reverse path graphic 1202.

According to a step 212, the mobile device 20 sends a control signal 1220 from the mobile device 20 to the vehicle system controller 110 of the vehicle 2 in response to receiving a selection of a direction of movement along the path via the control input 1210, 1212.

According to a step 214, the vehicle system controller 110 controls the movement (e.g., autonomously) of the vehicle 2 based on the selected shape of the path from step 206 and the selected direction of movement along the path from step 212. For example, the control signal 1220 includes information regarding the selected path and direction movement along the path (e.g., as represented by path graphics 1200, 1202) and the distance or time to move in the direction along the path, for example, based on a duration of time the control input 1210, 1212 is engaged.

Referring to FIGS. 3-10, example methods of automatically or semi-automatically generating the vehicle trailer graphic 300, 302 and determining an orientation direction 400 for the vehicle trailer graphic 300, 302 for display on the graphical user interface 120 of the mobile device 20 are now described. An orientation mode may be initiated through the user interface 120.

Figure 3:
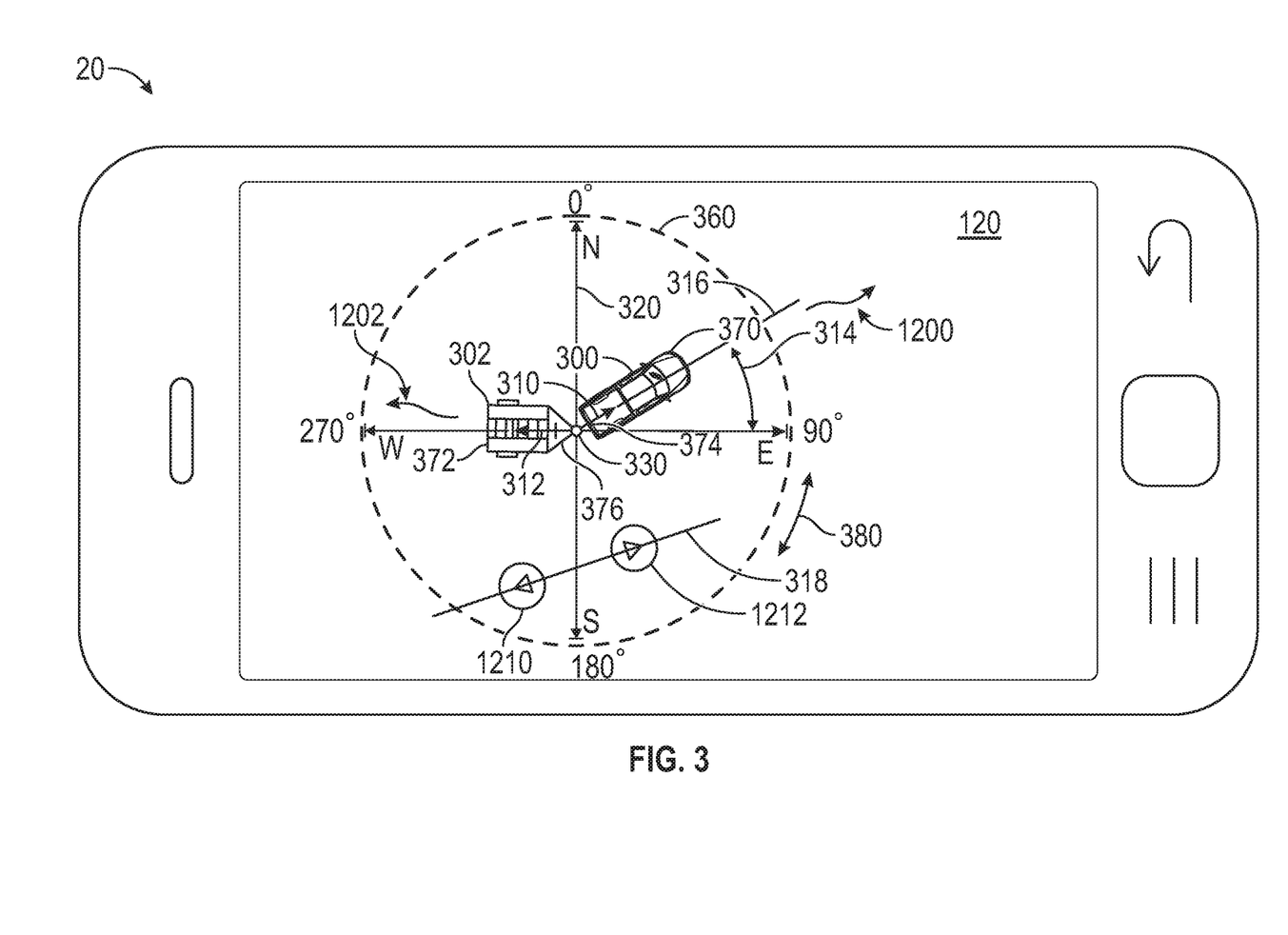
FIG. 3 is a schematic illustration of a mobile device with a user interface displaying a graphic of a vehicle and trailer in accordance with the present disclosure.

Referring to FIG. 3, the orientation of a vehicle graphic 300 and trailer graphic 302 may be determined using directions 310, 312. The direction 310 may be determined from the direction sensor 132 (e.g., a compass sensor). The direction 312 may be determined with an angle 314 that is measured relative to direction 310. The angle 314 is measured by the angle sensor 134. The directions 310, 312 orient the graphics 300, 302 on a coordinate system 320 (e.g., as vectors).

Two directions may be used (one for each of the vehicle 2 and trailer 14) to show the angle between the vehicle 2 and the trailer 14. Alternatively, one direction may be used if the system 100 is used to control the vehicle 2 without the trailer 14 or to approximate the orientation of the vehicle 2 and trailer 14 without showing any angle therebetween.

In FIG. 3, the coordinate system 320 is a polar coordinate system although other coordinate systems are contemplated. A point of connection (e.g., the hitch 12) between the vehicle 2 and the trailer 14 corresponds to a reference point 330 (e.g., origin) of the coordinate system 320.

As illustrated, the axes and degrees of the coordinate system 320 are associated with cardinal directions: north, south, east, and west. A reference direction at 0 degrees is a north direction, 90 degrees is an east direction, 180 degrees is a south direction, and 270 degrees is a west direction. It should be understood that the axes of the example coordinate system can be defined in different ways.

The directions 310, 312 are angles that are measured relative to the reference direction. In FIG. 3, the direction 310 is at 60 degrees and the direction 312 is at 270 degrees.

Conceptually, the direction 310 is a direction pointing from the hitch 12 to the front end 4 of the vehicle 2 and aligns with a length dimension of the vehicle 2 (e.g., symmetrically bisects the vehicle 2). The direction 310 is determined from the direction sensor 132 as an angle from 0 to 360 degrees on the coordinate system 320.

Similarly, the direction 312 is a direction moving from the hitch 12 to the back end 18 of the trailer 14 and aligns with a length dimension of the trailer 14 (e.g., symmetrically bisects the trailer 14). The direction 312 is determined or from the direction 310 and the angle 314 between the longitudinal axis 316 of the vehicle 2 and a longitudinal axis of the trailer 14. For example, the direction 312 is the direction 310 plus the angle 314 plus 180 degrees. Alternatively, the direction 312 can be directly determined from, for example, a trailer compass sensor.

The mobile device 20 receives information (e.g., directions 310, 312) from the vehicle 2 and generates an image 360 for display on the user interface 120. The image 360 displays the vehicle graphic 300 and the trailer graphic 302 on the coordinate system 320. For simplicity, the graphics 300, 302 may be displayed without displaying the coordinate system 320 (e.g., see FIGS. 7-10). However, for purposes of teaching, the coordinate system 320 is illustrated as visible in FIG. 3, for example, to further orient the user 24.

The vehicle graphic 300 and the trailer graphic 302 are oriented on the coordinate system 320 to extend radially outward from the reference point 330 of the coordinate system 320 and have longitudinal axes aligned with respective directions 310, 312. A front end 370 of the vehicle graphic 300 is distal from the reference point 330 and a back end 372 of the trailer graphic 302 is distal from the reference point 330. A back end 374 of the vehicle graphic 300 is proximal to the reference point 330 and a front end 376 of the trailer graphic 302 is proximal to the reference point 330. The reference point 330 represents a connection between the vehicle graphic 300 and the trailer graphic 302.

The scale of the graphics 300, 302 may be based on the dimensions of the vehicle 2 and trailer 14. The dimensions of the vehicle 2 and trailer 14 may be known values stored in memory, may be entered manually or selected, or may be determined from sensors 130 of the vehicle 2 and/or trailer 14.

The vehicle graphic 300 and the trailer graphic 302 are fixed in the respective directions 310, 312 on the coordinate system 320 unless or until the directions 310, 312 are updated with new information from the vehicle 2. The vehicle graphic 300 and the trailer graphic 302 rotate with rotation 380 of the coordinate system 320. For example, the image 360 rotates 380 to rotate the coordinate system 320 and graphics 300, 302. For illustration, the coordinate system 320 rotates 380 from the position illustrated in FIG. 3 to the position illustrated in FIG. 6; and rotation 380 of the coordinate system 320 is further illustrated in FIGS. 7-10.

The coordinate system 320 is rotated 380 such that the orientation of the vehicle graphic 300 and the trailer graphic 302 corresponds to the orientation of the vehicle 2 and the trailer 14. As such, the user interface 120 of the mobile device 20 provides an intuitive control for remotely controlling the movement of the vehicle 2 and trailer 14 from any position around a periphery 420 of the vehicle 2 and trailer 14.

Figure 4:
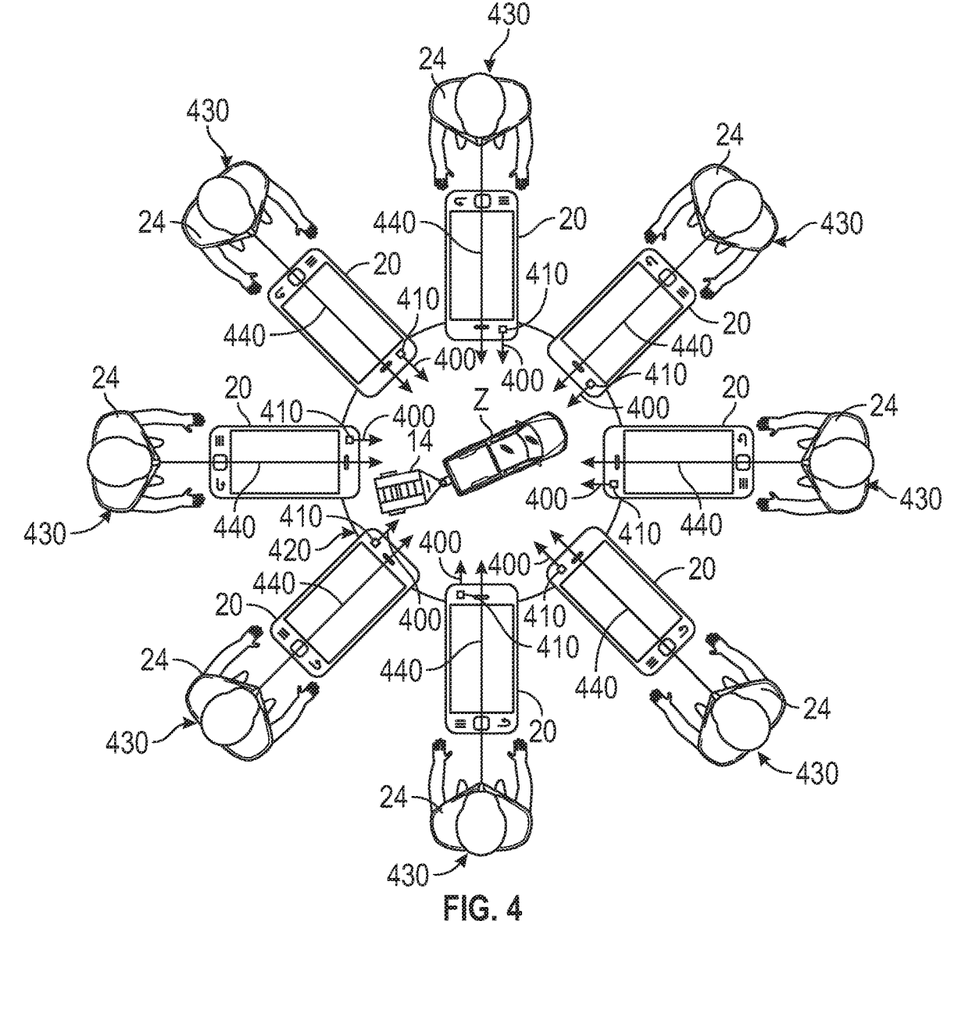
FIG. 4 is a top view of the vehicle and trailer of FIG. 1 illustrating the use of a mobile device by a user at various positions around a periphery of the vehicle and trailer according to the present disclosure.

Referring to FIG. 4, the coordinate system 320 is rotated 380 based on an orientation direction 400 (e.g., compass direction) from a compass sensor 410 of the mobile device 20. The orientation direction 400 reflects where the mobile device 20 is positioned around the periphery 420 of the vehicle 2 and trailer 14. Generally, in use, the user 24 stands at any location 430 around the periphery 420 of the vehicle 2 and the trailer 14. The user 24 faces the vehicle 2 and the trailer 14 in a viewing direction 440 with the mobile device 20 in between the user 24 and the vehicle 2/trailer 14. The mobile device 20 is inline with the viewing direction 440 so that the user 24 is viewing the user interface 120 with the vehicle 2 and the trailer 14 in the background.

With the mobile device 20 inline with the viewing direction 440, the orientation direction 400 is the same or approximately the same as the viewing direction 440. Both the orientation direction 400 and the viewing direction 440 change based on the location 430 of the mobile device 20 around the periphery 420 of the vehicle 2 and the trailer 14.

The orientation direction 400 and the viewing direction 440 are generally opposite to a direction from the vehicle 2 and trailer 14 to the location 430 where the mobile device 20 is used to control the vehicle 2 and the trailer 14. For example, if the mobile device 20 is used on the east side of the vehicle 2, the orientation direction 400 and the viewing direction 440 are west. If the mobile device 20 is used on the north side of the vehicle 2, the orientation direction 400 and the viewing direction 440 are south. Various viewing directions 440 and orientation directions 400 are illustrated in FIG. 4.

Figure 5:
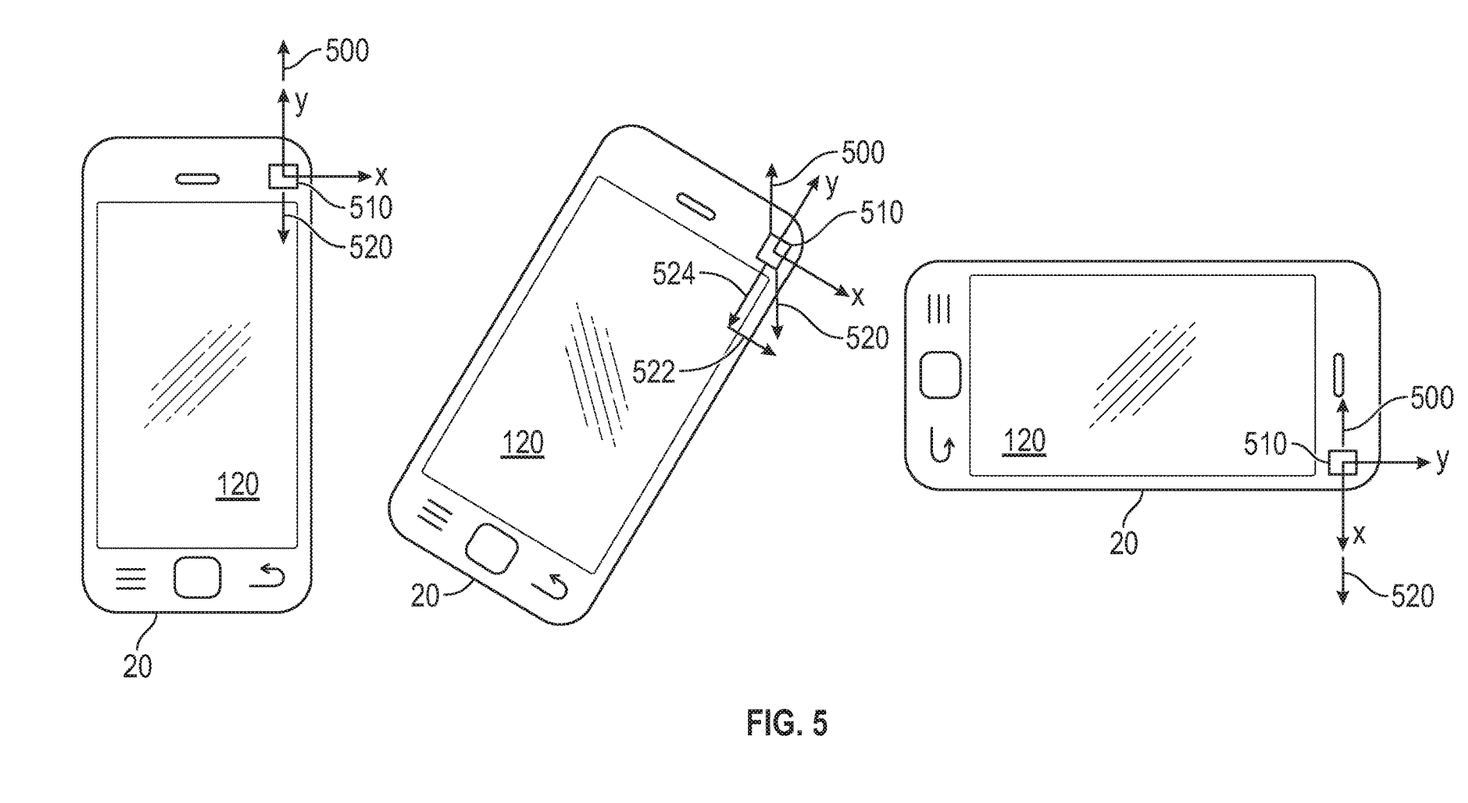
FIG. 5 is a schematic illustration of the mobile device of FIG. 2 illustrating various angles of rotation about an axis that is orthogonal to the user interface according to the present disclosure.
Figure 6:
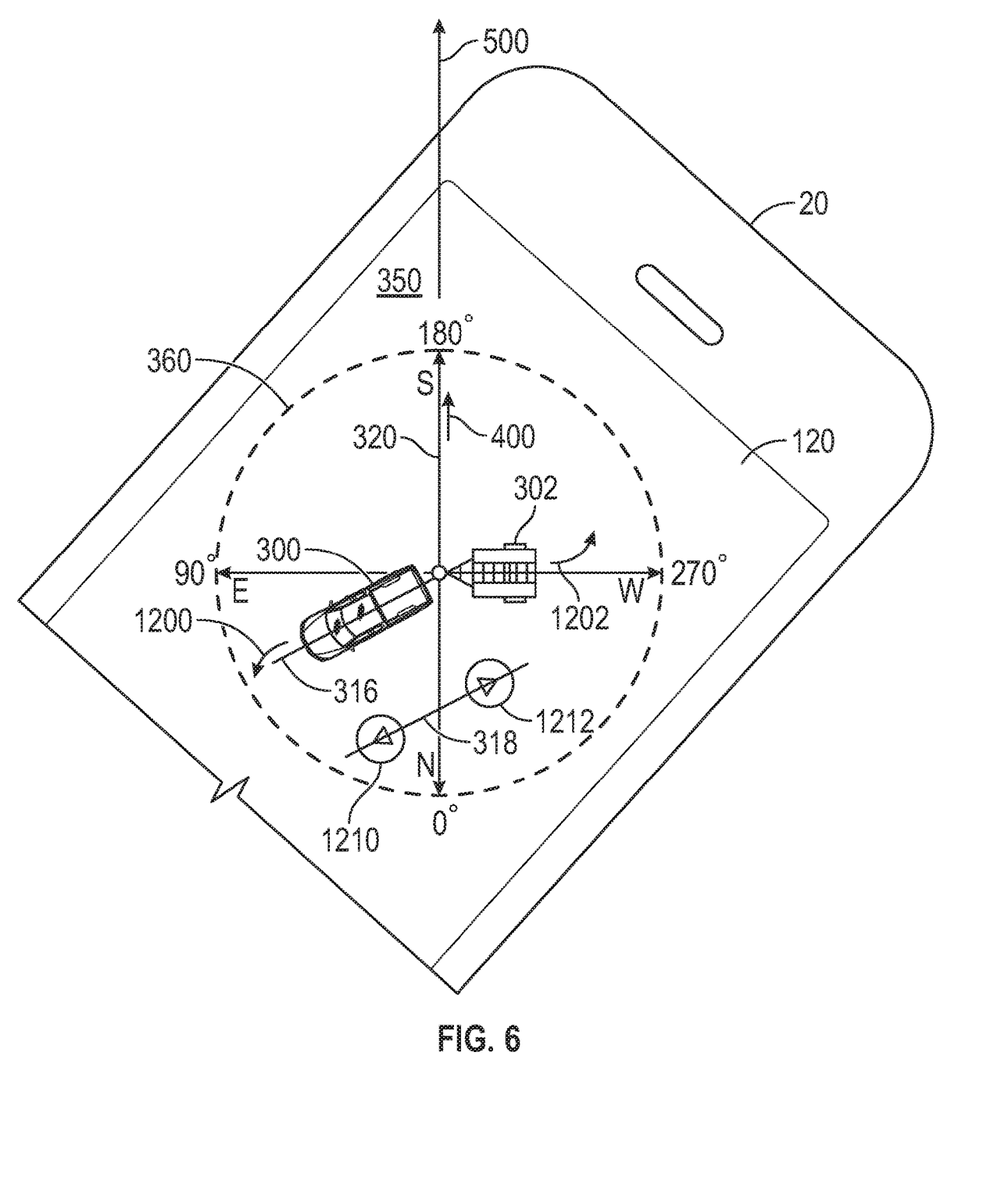
FIG. 6 is a partial schematic illustration of the mobile device of FIG. 3 in accordance with the present disclosure.

Referring to FIGS. 5 and 6, the coordinate system 320 or image 360 is rotated 380 such that the orientation direction 400 is aligned with an upward direction 500 of the mobile device 20.

Referring to FIG. 5, the upward direction 500 of the mobile device 20 is determined based on measurements from an accelerometer 510 of the mobile device 20. For example, gravitational acceleration (9.8 m/s2) is applied to the accelerometer 510 in a downward direction 520 (e.g., toward the surface of the earth). The accelerometer 510 measures the distribution of the acceleration along an x-axis and a y-axis (e.g., vectors 522, 524) of the mobile device 20, which represent a vector in the downward direction 520. The upward direction 500 is determined as being opposite the downward direction 520.

As illustrated in FIG. 5, holding the mobile device 20 in a portrait orientation, the acceleration 520 is in the negative direction on the y-axis and thus the upward direction 500 is in the positive direction on the y-axis. Holding the mobile device 20 in a landscape orientation, the acceleration 520 is in the positive direction on the x-axis and thus the upward direction 500 is in the negative direction on the x-axis. In another illustrated orientation, the acceleration (vector 520 is the sum of vector 522 on the negative y-axis and vector 524 on the positive x-axis) can also be distributed among the x-axis and the y-axis and the resulting upward direction 500 opposite the vector 520 with components on each axis.

Referring to FIG. 6, if the orientation direction 400 is south, the coordinate system 320 is rotated 380 such that south is aligned with the upward direction 500. The orientation direction 400 is displayed at the top of the coordinate system 320. Accordingly, north is displayed at the bottom of the coordinate system 320, west is at the right of the coordinate system 320, and east is at the left of the coordinate system 320.

Referring to FIG. 7-10, the vehicle graphic 300 and the trailer graphic 302 are displayed on the user interface 120 such that the orientation of the vehicle 2 and the trailer 14 in a user's perspective view from a location 430 along the periphery 420 in a viewing direction 440 corresponds to the orientation of the vehicle graphic 300 and trailer graphic 302 displayed for the user 24 on the user interface 120. The vehicle graphic 300 and the trailer graphic 302 represent a top view of the vehicle 2 and trailer 14 although other views are contemplated.

Figure 7:
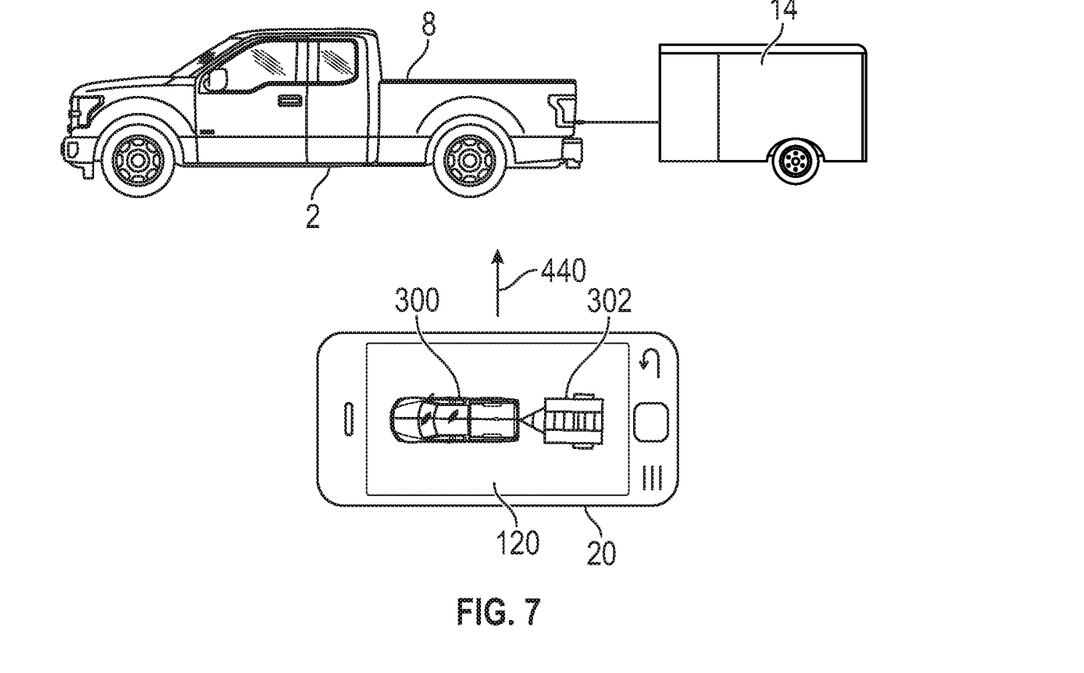
FIG. 7 is a schematic illustration of the use of the mobile device from the driver side of the vehicle and trailer in accordance with the present disclosure.

FIG. 7 illustrates a perspective view of the vehicle 2 and trailer 14 from the driver side 8 and the corresponding orientation of the vehicle graphic 300 and trailer graphic 302 on the mobile device 20.

Figure 8:
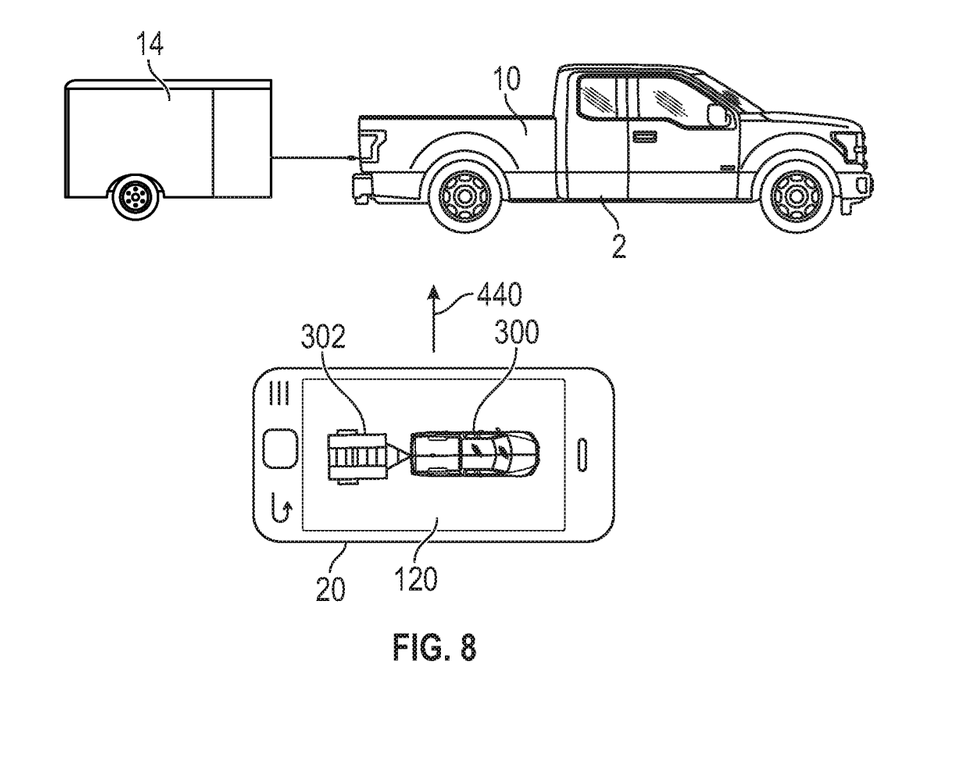
FIG. 8 is a schematic illustration of the use of the mobile device from the passenger side of the vehicle and trailer in accordance with the present disclosure.

FIG. 8 illustrates a perspective view of the vehicle 2 and trailer 14 from the passenger side 10 and the corresponding orientation of the vehicle graphic 300 and trailer graphic 302 on the mobile device 20.

Figure 9:
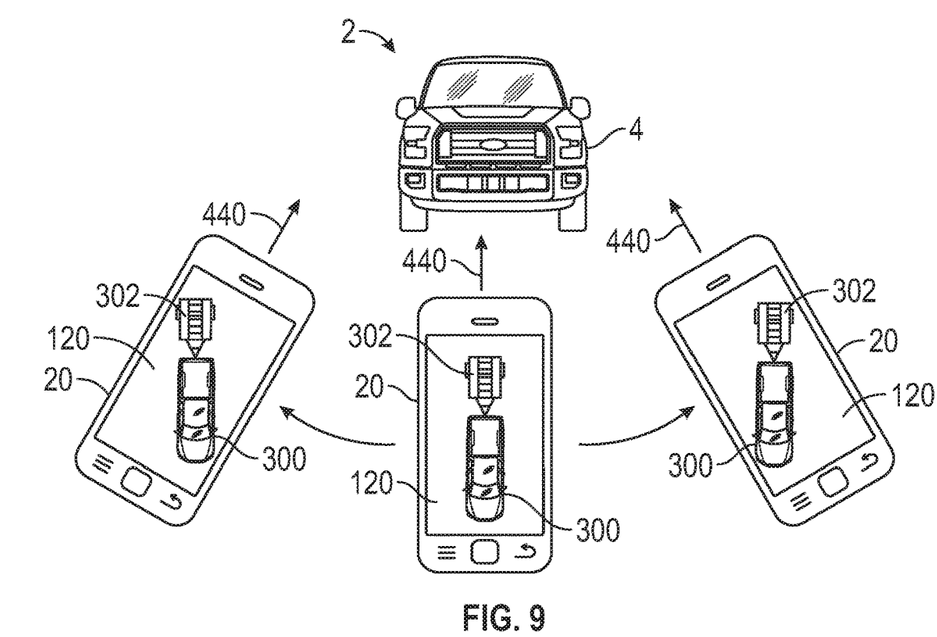
FIG. 9 is a schematic illustration of the use of the mobile device from the front side of the vehicle in accordance with the present disclosure.

FIG. 9 illustrates various perspective views of the vehicle 2 and trailer 14 from the front end 4 (e.g., driver-front end, direct front end, and passenger-front end) and the corresponding orientation of the vehicle graphic 300 and trailer graphic 302 on the mobile device 20.

Figure 10:
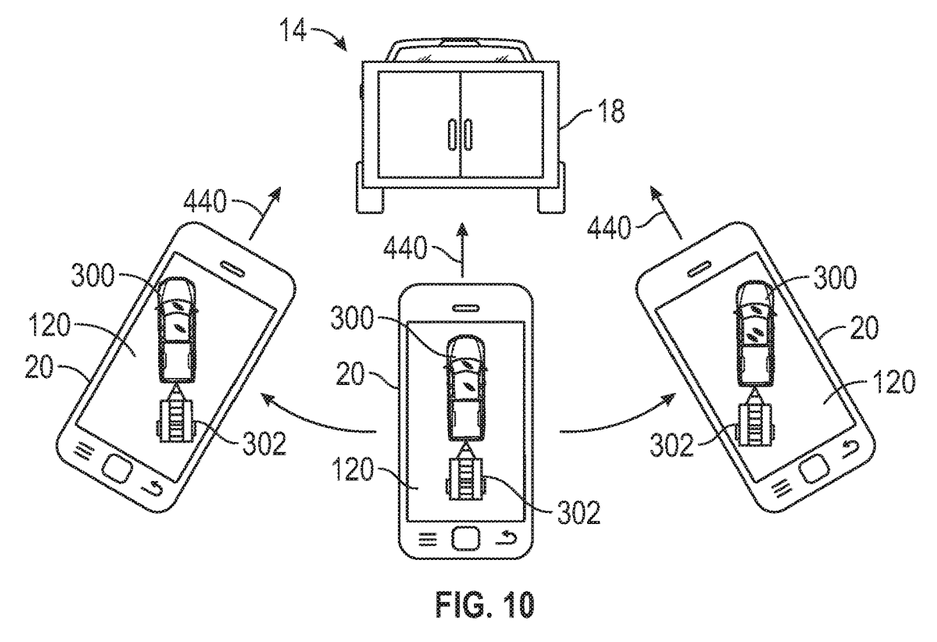
FIG. 10 is a schematic illustration of the use of the mobile device from the back side of the trailer in accordance with the present disclosure.

FIG. 10 illustrates various perspective views of the vehicle 2 and the trailer 14 from the back end 18 (e.g., driver-back end, direct back end, and passenger-back end) and the corresponding orientation of the vehicle graphic 300 and trailer graphic 302 on the mobile device 20.

The orientation of the vehicle graphic 300 and the trailer graphic 302 can be determined for display according to alternative methods.

For example, the mobile device 20 can store a plurality of images of different predetermined orientations of the vehicle graphic 300 and trailer graphic 302 (e.g., those represented in FIGS. 7-10). The mobile device 20 selects an image 1102 from the plurality of images for display on the user interface 120 based on a location 1100 of the mobile device 20.

Figure 11:
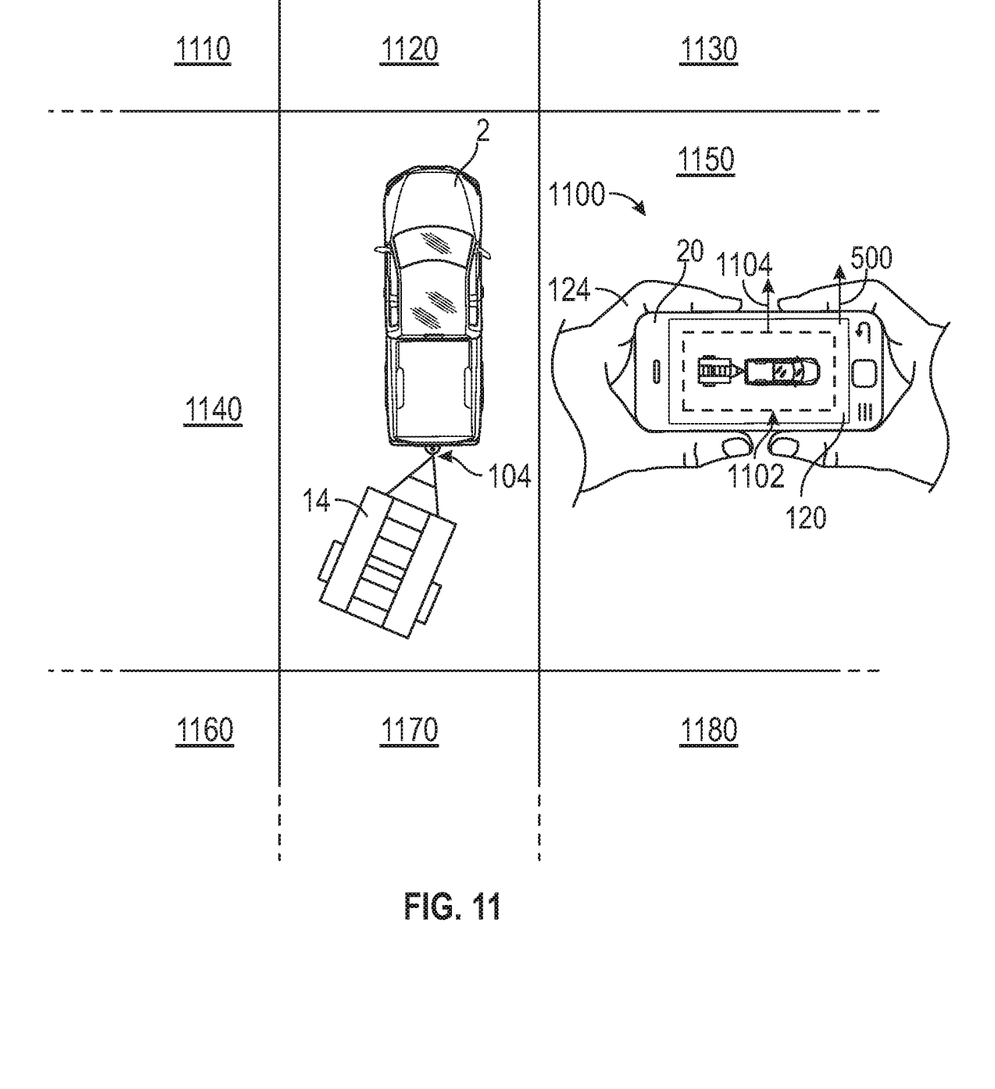
FIG. 11 is a schematic illustration of zones around the vehicle and trailer and the use of the mobile device at a location in one of the zones in accordance with the present disclosure.

Referring to FIG. 11, each image 1102 has a corresponding orientation direction 1104. The orientation direction 1104 is aligned with the upward direction 500 to orient the image 1102 (e.g., as described above with the orientation direction 400 and the upward direction 500). For example, the images 1102 may be the same but are rotated according to the orientation direction 1104 to provide different orientations.

The images 1102 and orientation directions 1104 are stored and associated with one of a plurality of zones 1110, 1120, 1130, 1140, 1150, 1160, 1170, 1180 around the periphery of the vehicle 2 and trailer 14. The image 1102 is displayed on the graphical user interface 120 according to the orientation direction 1004. The image 1102 displays the vehicle graphic 300 and trailer graphic 302 according to a view from an associated zone 1110, 1120, 1130, 1140, 1150, 1160, 1170, 1180.

The vehicle 2 and/or trailer 14 determines the location 1100 of the mobile device 20 (e.g., with LIDAR sensors or antennas) relative to the vehicle 2 and the trailer 14. As each location 1100 of the mobile device 20 relative to the vehicle 2 and the trailer 14 is associated with one of the plurality of zones 1110, 1120, 1130, 1140, 1150, 1160, 1170, 1180, the vehicle 2 (or the mobile device 20) determines the associated one of the plurality of zones 1110, 1120, 1130, 1140, 1150, 1160, 1170, 1180 based on the determined location 1100.

For example, the illustrated location 1100 is in zone 1150. Once the zone 1150 is determined, the vehicle 2 (or the mobile device 20) determines the associated image 1102 and orientation direction 1104. To orient the image 1102 on the user interface 120, the orientation direction 1104 is aligned with the upward direction 500.

According to another example, feature detection, machine learning, and/or edge detection is used to determine the orientation of the vehicle and trailer (e.g., through identification of perspective lines in an image of a camera of the mobile device 20). The corresponding orientation of the vehicle graphic and trailer graphic can then be determined.

For example, an image recognition application of the mobile device can identify features of the vehicle and trailer in an image captured by a camera of the mobile device from a position around the periphery of the vehicle and trailer. Based on the features of the vehicle and/or trailer, and/or the absence of features of the vehicle and or trailer, the location of the mobile device relative to the trailer can be determined.

According to another example, the user interface can display the images for selection on the user interface and the user can select the image that most closely reflects the position and perspective of the user relative to the vehicle and trailer.

Referring to FIG. 2, once the orientation of the vehicle graphic 300 and the trailer graphic 302 are determined by the mobile device 20 and displayed on the user interface 120, the mobile device 20 determines and generates a forward path 1200 and a reverse path 1202 extending from the vehicle graphic 300 and the trailer graphic 302. For example, a path generation mode may be initiated through the user interface 120.

The forward path 1200 represents the controlled path of the vehicle 2 and trailer 14 moving in a forward direction (e.g., when using the forward control input 1210 of the user interface 120). The forward path 1200 may be straight or may be have a curved shape. The curved shape of the forward path 1200 is based on the angle of the steering wheel of the vehicle 2 as the vehicle 2 moves forward along the path. The angle of the steering wheel may change at certain locations along the path to achieve a curved shape. As such, a forward path 1200 with a curved shape may be associated with various steering wheel angles that are a function of distance or location along the forward path 1200 to control the vehicle 2 and trailer 14 along a curved path.

The reverse path 1202 represents the controlled path of the vehicle 2 and trailer 14 moving in a reverse direction (e.g., when using a reverse control input 1212 of the user interface 120). The reverse path may be straight or may be have a curved shape. The curved shape of the reverse path is based on the angle of the steering wheel of the vehicle 2. The angle of the steering wheel may change at certain locations along the path to achieve a curved shape. As such, a reverse path 1202 with a curved shape may be associated with various steering wheel angles that are a function of distance along the reverse path 1202 to control the vehicle 2 and trailer 14 along the curved path.

Figure 12:
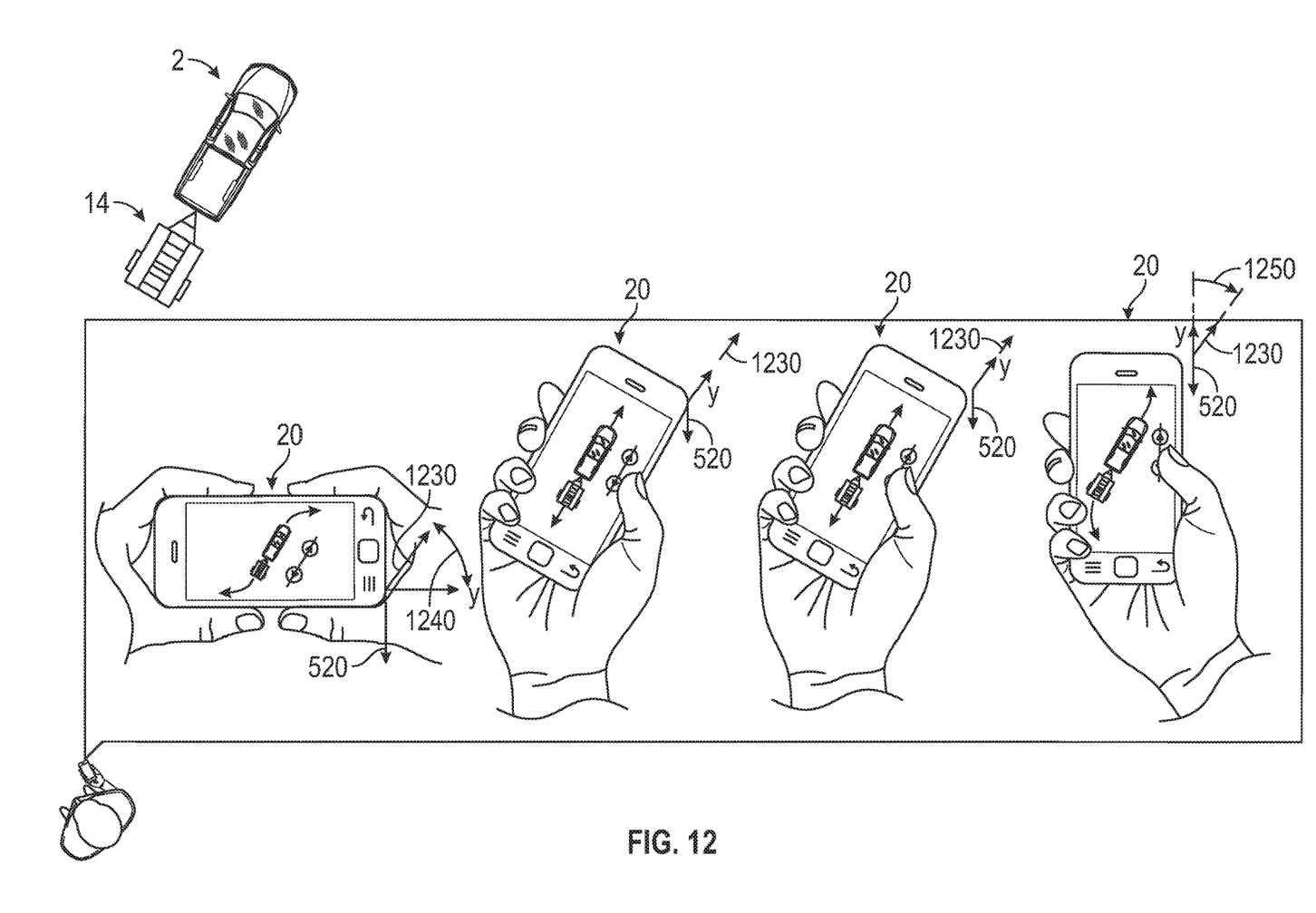
FIG. 12 is a schematic illustration of a method of rotating the mobile device to change the shape of a path graphic in accordance with the present disclosure.

In the path generation mode, the shape of the paths 1200, 1202 may be determined and displayed as a function of the rotation of the mobile device 20. For example, rotation of the mobile device 20 is described with respect to FIG. 5. In FIG. 12, the mobile device 20 is rotated from a landscape orientation (left) in a counter-clockwise to an angled orientation (middle), and then again from the angled orientation to a portrait orientation (right).

Referring to FIG. 12, the y-axis of the accelerometer 510 is shown along with a reference direction 1230. For example, the reference direction 1230 is the measured downward direction plus 135 degrees.

Moving from the example on the left to the example on the right, the amount of rotation can be measured as an angle in a direction from the y-axis to the reference direction 1230. In the example on the left, an angle 1240 to the reference direction 1230 is in a counter-clockwise direction from the y-axis. In the middle examples, the y-axis is aligned with the reference direction 1230. In the example on the right, an angle 1250 to the reference direction 1230 is in a clockwise direction from the y-axis.

The rotation of the mobile device 20 changes the shape of the paths 1200, 1202. In particular, the illustrated paths 1200, 1202 curve up and to the right and curve down and to the left to varying degrees when the mobile device 20 is rotated clockwise such that the reference direction 1230 is counterclockwise from the y-axis. The illustrated paths 1200, 1202 curve up and to the left and curve down and to the right to varying degrees when the mobile device 20 is rotated counter-clockwise such that the reference direction 1230 is clockwise from the y-axis.

Rotation of the mobile device 20 may scroll through different possible paths 1200, 1202 with different shapes that may be achieved with predetermined control instructions for controlling the steering angle based on distance along the path. In the reverse direction, the possible paths may depend on the initial angle between the vehicle 2 and the trailer 14.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

It should also be understood that the word "example" as used herein is intended to be non-exclusionary and non-limiting in nature. More particularly, the word "exemplary" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, nonvolatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

The invention claimed is:

1. A method for controlling a vehicle and trailer, comprising: determining an orientation direction relative to a direction of a vehicle graphic for display of the vehicle graphic on a user interface of a mobile device, the vehicle graphic representing a vehicle and a trailer, wherein the orientation direction is indicative of a location of the mobile device around a periphery of the vehicle and the trailer; presenting, via the user interface of the mobile device, the vehicle graphic according to the orientation direction; presenting, via the user interface, a path graphic representing a path extending from the vehicle graphic in one of a forward direction and a reverse direction, wherein a shape of the path of the path graphic is changed based on an amount of rotation of the mobile device and the location of the mobile device around the periphery of the vehicle and the trailer; presenting, based on the rotation of the mobile device, different possible paths, wherein the different possible paths curve toward an axis of the mobile device; and presenting, via the user interface, at least one control input corresponding to a direction of movement along the path; further comprising sending a control signal from the mobile device to a vehicle system controller of the vehicle in response to receiving a selection of the direction of movement along the path via the at least one control input.

2. The method of claim 1, wherein the orientation direction is determined from a plurality of different orientation directions corresponding to a plurality of different locations of the mobile device around a periphery of the vehicle and the trailer.

3. The method of claim 2, wherein each of the plurality of different orientation directions is at a different angle with respect to the direction of the vehicle graphic.

4. The method of claim 1, further comprising measuring the orientation direction with a directional sensor of the mobile device.

5. The method of claim 4, further comprising measuring the direction of the vehicle graphic with a directional sensor of the vehicle.

6. The method of claim 1, wherein determining the orientation direction includes receiving a user selection of a vehicle graphic from one of a plurality of vehicle graphics, each of the plurality of vehicle graphics corresponding to a different orientation direction.

7. The method of claim 1, wherein determining the orientation direction includes determining a position of the mobile device relative to the vehicle.

8. The method of claim 7, further comprising determining a zone from a plurality of zones based on the position of the mobile device, each zone corresponding to a different orientation direction based on the location of the mobile device relative to the vehicle and the trailer.

9. The method of claim 1, further comprising rotating the mobile device, wherein the orientation direction of the vehicle graphic is maintained after the rotating.

10. The method of claim 9, wherein the orientation of the vehicle graphic is maintained relative to a viewing direction.

11. The method of claim 1, further comprising receiving a selection of a shape of the path.

12. The method of claim 11, wherein receiving the selection of the shape of the path includes receiving a selection of one of a plurality of path graphics, each of the plurality of path graphics including a different shape of the path.

13. The method of claim 11, wherein receiving the selection of the shape of the path includes receiving a selection of the direction of movement via the control input corresponding to the path graphic.

14. The method of claim 1, further comprising aligning the at least one control input along an axis that is generally parallel to a longitudinal axis of the vehicle graphic.

15. The method of claim 1, further comprising controlling movement of the vehicle with the vehicle system controller based on a shape of the path of the path graphic.

16. A system, comprising:
a vehicle control system configured to control a movement of a vehicle and a trailer coupled to the vehicle based on a shape of a path and corresponding control input; and
a mobile device, comprising:
a user interface;
a processor; and
a memory comprising instructions that, when executed by the processor, cause the processor to perform operations comprising:
determine an orientation direction relative to a direction of a vehicle graphic, the vehicle graphic representing the vehicle and a trailer, wherein the orientation direction is indicative of a location of the mobile device around a periphery of the vehicle and the trailer;
present, via the user interface of the mobile device, the vehicle graphic according to the orientation direction; and
present, via the user interface, a path graphic representing a path extending from the vehicle graphic in a forward direction and a reverse direction, wherein a shape of the path of the path graphic is changed based on an amount of rotation of the mobile device and the location of the mobile device around the periphery of the vehicle and the trailer;

present, based on the rotation of the mobile device, different possible paths, wherein the different possible paths curve toward an axis of the mobile device;

present, via the user interface, a control input corresponding to a direction of movement along the path; and send a control signal from the mobile device to the vehicle control system in response to receiving an input at the control input.

17. The method of claim 1, further comprising:
capturing, by a camera of the mobile device, an image of the vehicle and the trailer, wherein determining the orientation direction of the vehicle relative to the direction of the vehicle graphic is based on identifying a feature of the vehicle and trailer in the image using machine learning.

* * * * *